May 16, 1967     C. I. STARNES     3,319,698

MEANS AND METHODS FOR MAKING SINKERS FOR FISHING LINES

Filed June 3, 1964

INVENTOR.
CHARLES I. STARNES

BY *Alfred T. Petchaft*

ATTORNEY

United States Patent Office 3,319,698
Patented May 16, 1967

3,319,698
MEANS AND METHODS FOR MAKING SINKERS
FOR FISHING LINES
Charles I. Starnes, R.R. 1, Box 415,
Edwardsville, Ill. 62025
Filed June 3, 1964, Ser. No. 372,329
2 Claims. (Cl. 164—112)

This invention relates in general to certain new and useful improvement in means and methods for making sinkers for fishing lines.

The average fishing enthusiast usually has a tackle box filled with different kinds of hooks, lines, lures, floats and sinkers in order to meet varying conditions encountered when actually fishing in a stream, lake, or other body of water. All of this equipment is relatively expensive and, frequently is lost or damaged in use, but sinkers are perhaps lost more often than other items of fishing equipment, and are relatively expensive when cost is compared to the actual intrinsic value of the materials and labor used therein. Furthermore, each sportsman has his own ideas as to the precise size or weight which he prefers to use for a given type of line, hook, or fishing locality. However, sinkers are manufactured in a limited number of standard shapes and sizes and the average individual must select his sinker from whatever supply may be available in the sporting-goods dealer's stock.

It is, therefore, the primary object of the present invention to provide means and methods for making sinkers for fishing lines, whereby the individual sportsman or fishing enthusiast can make sinkers at very low unit-cost and in a wide range of different weights or sizes.

It is another object of the present invention to provide means, of the type and for the purpose stated, which are simple in construction, easy to use, and moderate in cost.

It is a further object of the present invention to provide methods of the type and for the purpose stated, which can be readily mastered and carried out by practically any individual having even the most rudimentary mechanical skill and a minimul of auxiliary tools or equipment.

It is an additional object of the present invention to provide means and methods of the type state which make it possible for a sportsman, or fishing enthusiast, to manufacture a supply of sinkers quickly and economically in such sizes, weights, and quantities as may be desired.

In the accompanying drawings (one sheet)—

Figure 1:
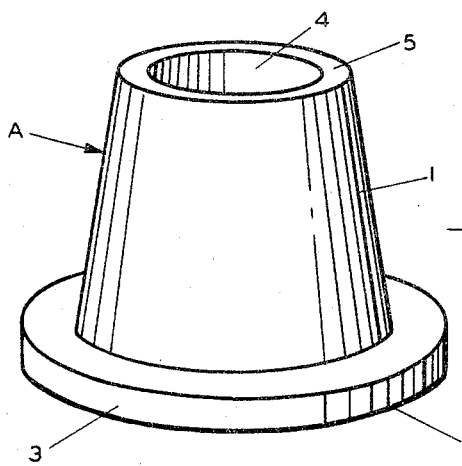
FIG. 1 is a persepective view of a mold constructed in accordance with and embodying the present invention.
Figure 2:
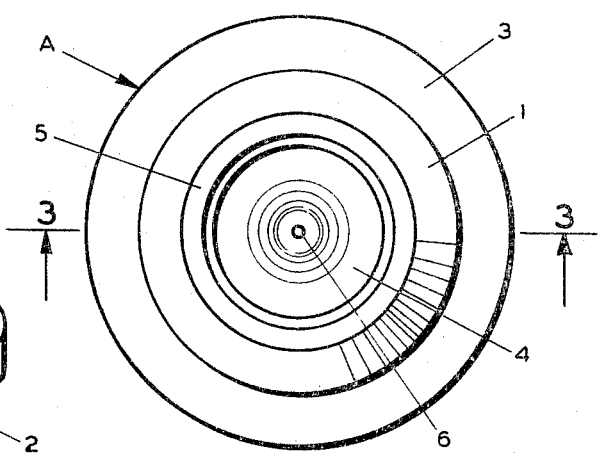
FIG. 2 is a top plan view of the mold.
Figure 3:
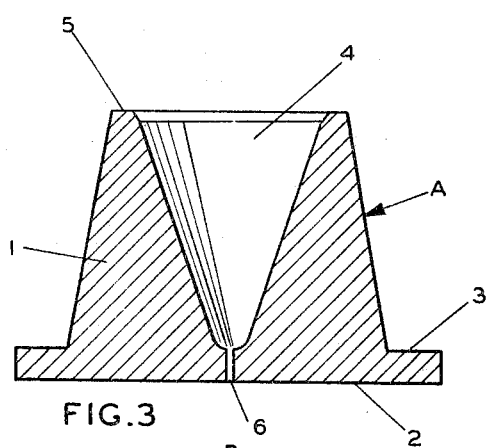
FIG. 3 is a vertical sectional view taken along line 3—3 of FIG. 2.

Referring now in more detail and by reference characters to the drawings which illustrate the means and methods of the present invention, A designates a one-piece mold, formed of steel, aluminum, or other relatively high melting point metal, and integrally including a frustro-conical body 1, which, when positioned for use, tapers upwardly and inwardly from a flat circular under face 2 which is perpendicular to the vertical axis of the body 1 and is provided with a diametrally enlarged flange 3, the latter being large enough to facilitate convenient handling and preferably being wide enough so that the user may clamp the mold A down upon a board, table, or work-bench by a conventional C-clamp or any other suitable means.

Interiorly, the mold A is provided with a mold-cavity 4 having substantially the shape of an inverted cone opening at its upper or wide end upon the top surface of rim 5 of the body 1, and being provided at its lower end with a small-bore concentric opening or aperture 6. This aperture 6 should have a diametral size substantially equal to, but very slightly larger than, the outside diameter of the wire $w$ used for making the sinkers. The relationship between the diametral size of the wire $w$ and the aperture 6 is such that the wire $w$ will slide freely through the aperture 6, but will fit snugly enough therein, so that the molten metal poured therein will not leak through. As a matter of actual experience, it has been found that, due to the surface tension exhibited by molten lead, and other similar low-melting point metals or alloys, this diametral tolerance or clearance can be of the order of eight to ten thousandths, without any difficulty.

Figure 4:
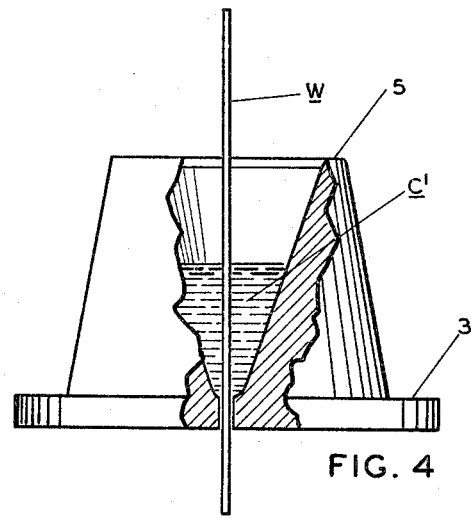
FIGS. 4 and 5 are side elevational views partly broken away and in section of a mold and a quantity of molten metal poured therein, illustrating successive steps in the making of sinkers according to the method of the present invention.
Figure 5:
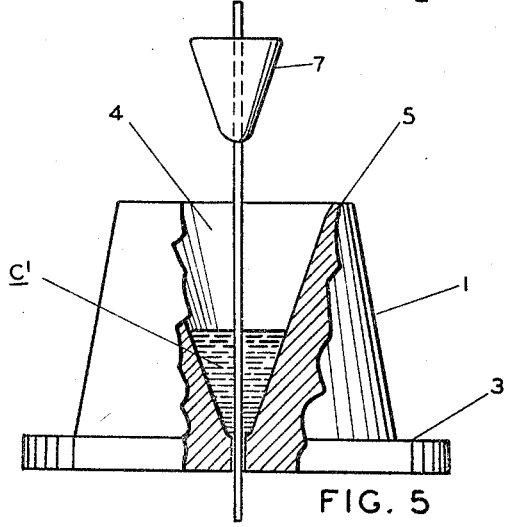
Figure 6:
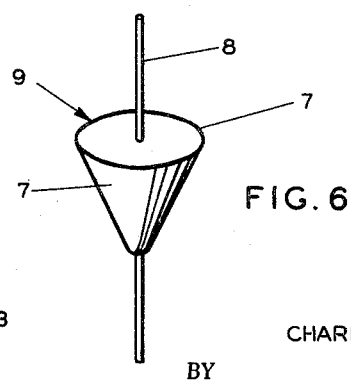
FIG. 6 is a perspective view of the finished sinker.

In use, the mold A can be clamped down in overhanging position along the edge of a work-bench, so that the aperture 6 is vertically unobstructed or "in the clear" so to speak. This can also be accomplished by clamping the mold A down upon a flat horizontal board which has a large (i.e. ¾" to 1" diameter) hole bored therein. In the latter case, the mold A is obviously located so that the aperture 6 is more or less centered over such hole, with the mold A in position, a length of wire $w$ is threaded down through the aperature 6 for whatever length the user desires, and a cone $c^1$ of molten lead poured into the mold-cavity 4 to any selected height as may be desired within the dimensional limits of the mold A, as illustrated in FIG. 4. The wire $w$ may be of malleable iron, soft steel, or any suitable material having a relatively high melting point. Because of the relatively large mass of metal in the lower portion of the body 1 around the small-bore aperture 6, the molten lead will chill and solidify almost immediately in the lower part of the mold-cavity 4. Within a few seconds, the entire cone of lead $c^1$ will solidify and adhere tightly to the piece of wire $w$. Assuming that the wire $w$ has not been mishandled and bent, or kinked prior to, or during insertion through the mold-cavity 4 and aperture 6, it will extend upwardly through the mold-cavity 4 in substantially co-axial relation thereto, and thus will extend co-axially through the cone of lead $c^1$. After the first cone of lead $c^1$ has cooled for a minute or two, the wire $w$ may be pulled upwardly and the now solidified cone of lead $c^1$ will immediately come free and can be lifted with the wire $w$ to the position shown in FIG. 5, so that a new portion of the piece of wire $w$ is within the mold-cavity 4. It is, of course, obvious that the height to which the cone of lead $c^1$ is elevated above the mold-cavity 4 is a matter of choice. Thereupon, a second cone $c^2$ of molten lead is poured into the mold-cavity 4 and allowed to solidify. This procedure is repeated until the piece of wire $w$ has been provided with a series of spaced cones of lead along its entire length. The spring between successive cones depends upon the height to which each such cone is lifted before the next cone is poured. Similarly, the size of each cone depends upon the amount of lead poured into the mold-cavity 4. Obviously, these spacings and sizes can be uniform along a single piece of wire $w$ or, for that matter, can be varied as may be desired. In either case, the piece of wire can be cut with pliers, snippers, or any other suitable tool, in the portions of its length between each successive cone to make individual sinkers $s$, which consist of a conical body of lead 7 molded tightly and adherently in co-axial alignment around a length of malleable wires 8 which can be bent in any desired manner for attachment to a fishing line.

Due to the meniscus effect, the body of lead 7 will have a smooth rounded top edge 9 that is ideally suited to the purpose and will not tend to cut the fishing line or catch upon weeds or debris in the water.

Although in the above described method, lead has been specified as the material used for making the sinkers *s*, it should be understood that any low melting point metal or alloy can be used, such as common plumbers solder, or the like. Furthermore, it should be noted that the mold A, being of relatively large mass, will not heat up significantly under ordinary conditions of use, nevertheless, some users may acquire sufficient skill and manual dexterity, so that the successive pourings may occur at rapid intervals. In such case, it may be necessary to stop for a few minutes after five or six sinkers have been poured to allow the mold A to cool down. In such case, it is also possible to chill the mold A after a series of successive pourings by wrapping it momentarily in a cloth or rag soaked in cold water. Actually, the temperature of the mold A is not critical, but by keeping the mold A comparatively cool, the surface of the body 7 of the sinkers *s* will be a little smoother and the parting from the mold will be a little easier. For instance, when the mold A becomes unduly hot, it may be necessary to tap the mold A gently, after the body 7 has solidified, to effect release.

It should be understood that changes and modifications in the form, construction, arrangement, and combination of the several parts of the means and methods for manufacturing sinkers for fishing lines may be made and substituted for those herein shown and described without departing from the nature and principle of my invention.

Having thus described my invention, what I claim and desire to secure by Letters Patent is:

1. The method of making sinkers for fishing lines; said method comprising the following steps:
    (a) providing a mold having a wide upwardly opening mouth and a downwardly converging mold-cavity which is provided at its bottom extremity with an aperture;
    (b) threading a piece of wire through the aperture so that a portion of the wire extends above the mold-cavity and a portion of the wire extends below the mold-cavity;
    (c) holding the portion of the wire within the mold-cavity at rest;
    (d) pouring a quantity of molten metal, the melting point of which is substantially below that of the wire, into the mold-cavity and around a portion of the wire within the mold-cavity;
    (e) allowing the molten metal to solidify in the formation of a bob;
    (f) pulling the wire and bob upwardly through the mouth of the mold-cavity whereby to remove the bob from the mold-cavity; and
    (g) pouring a successive quantity of said molten metal into the mold-cavity around that portion of the wire located within the mold-cavity in downwardly spaced relation to the bob previously cast and allowing it to solidify to form a second bob on the wire.

2. The method of making sinkers for fishing lines; said method comprising the following steps:
    (a) providing a mold having a wide upwardly opening mouth and a downwardly converging mold-cavity which is provided at its bottom extremity with an aperture;
    (b) threading a piece of wire through the aperture so that a portion of the wire extends above the mold-cavity and a portion of the wire extends below the mold-cavity;
    (c) pouring a quantity of molten metal, the melting point of which is substantially below that of the wire, into the mold-cavity and around a portion of the wire within the mold-cavity;
    (d) allowing the molten metal to solidify in the formation of a bob;
    (e) removing the wire and bob as a unit from the mold by pulling the wire and bob upwardly through the mouth of the mold-cavity;
    (f) pouring a successive quantity of said molten metal into the mold-cavity and allowing it to solidify to form a second bob; and
    (g) severing the wire between the successive bobs to form separate sinkers.

References Cited by the Examiner

UNITED STATES PATENTS

| | | | |
|---|---|---|---|
| 1,250,601 | 12/1917 | Littmann | 22—203 |
| 1,711,369 | 4/1929 | Wade | 22—203 |
| 1,782,813 | 11/1930 | Ferriera | 249—97 |
| 3,060,054 | 10/1962 | Russell et al. | 22—57.2 |
| 3,199,829 | 8/1965 | Calim | 22—59 |

J. SPENCER OVERHOLSER, *Primary Examiner.*

V. K. RISING, *Assistant Examiner.*